United States Patent [19]

Kobayashi et al.

[11] Patent Number: 4,760,566
[45] Date of Patent: Jul. 26, 1988

[54] METHOD OF CONTROLLING WRITE OPERATION FOR ROTATING TYPE RECORDING MEDIUM

[75] Inventors: Masaaki Kobayashi; Yuji Yamane, both of Odaware; Takashi Doi, Hadano, all of Japan

[73] Assignee: Hitachi, Ltd., Tokyo, Japan

[21] Appl. No.: 847,167

[22] Filed: Apr. 2, 1986

[30] Foreign Application Priority Data

Apr. 8, 1985 [JP] Japan ............ 60-72611

[51] Int. Cl.$^4$ .............. G11B 20/10; G11B 5/024
[52] U.S. Cl. .................... 369/48; 369/59; 369/100; 360/60; 360/66
[58] Field of Search ........... 369/59, 54, 58, 47, 369/48, 32, 100, 111; 360/60, 61, 66; 346/76 L

[56] References Cited

U.S. PATENT DOCUMENTS

| | | | |
|---|---|---|---|
| 3,530,441 | 9/1970 | Ovshinsky | 365/113 |
| 4,126,887 | 11/1978 | Miyazaki | 360/48 |
| 4,308,612 | 12/1981 | Miyawchi | 369/48 |
| 4,523,304 | 6/1985 | Satoh | 369/32 |
| 4,566,088 | 1/1986 | Yoshida | 369/44 |
| 4,606,016 | 8/1986 | Verboom | 369/54 |
| 4,611,314 | 9/1986 | Ogata | 369/48 |

FOREIGN PATENT DOCUMENTS 170837 5/1983 Japan ............ 369/13

OTHER PUBLICATIONS

"High-Capacity Optical Disk File Storage Device for Coded Information", Ripkei Electronics Journal, Nov. 21, 1985, by Tsunoda et al.
*Peripheril Devices*, by Flores, published by Prentice-Hill, Inc., ©1973, pp. 298-301, 314.

Primary Examiner—Alan Faber
Attorney, Agent, or Firm—Antonelli, Terry & Wands

[57] ABSTRACT

A method of controlling a write operation for a rotating type recording medium in which a plurality of tracks are formed in such a manner that each track is divided into a plurality of blocks having respective addresses and each block is used as the information recording/reproducing unit, is disclosed. In this method, each block includes an information recording field and a flag field for indicating the presence or absence of recorded information in the information recording field, to follow the following procedure. That is, when a high-ranking apparatus specifies a block and issues a write instruction for writing information in the specified block, the flag field of the specified block is first checked, and then the first recording mode for immediately recording new information in the information recording field of the specified block or the second recording mode for recording new information in the information recording field of the specified block after an erasing operation has been performed for the above information recording field, is executed depending upon whether the flag field of the specified block indicates the absence of recorded information or the presence of recorded information.

12 Claims, 6 Drawing Sheets

METHOD OF CONTROLLING WRITE OPERATION FOR ROTATING TYPE RECORDING MEDIUM

BACKGROUND OF THE INVENTION

The present invention relates to a method of controlling a write operation for a rotating type recording medium, and more particularly to a write operation control method suitable for use in an erasable optical disc.

Recently, with the advance in information processing techniques, the amount of data processed by a data processor has been greatly increased. Thus, an optical disc which can store a large amount of data at a high recording density has been drawing attention. In an optical disc apparatus, a light beam emitted from a laser light source is focussed to a light spot having a diameter of 1 to 2 μm, and the thermal change of that portion of a recording film which is irradiated with the light spot, is used for recording information in the recording film. Further, the recorded information is reproduced in such a manner that the recording film is irradiated with a light beam having a relatively weak intensity, and the difference between the intensity of light reflected from a film portion which has been subjected to the above thermal change and the intensity of light reflected from an ordinary film portion is detected.

As described on pages 189 to 213 of the Nov. 21, 1983 issue of the "NIKKEI Electronics", for example, an optical disc apparatus in which a metal film made of a ternary alloy Pb-Te-Se is used as the recording film and laser light of high power is used in the information recording operation to form a data pit having a diameter of about 0.8 μm in the recording film, has been put to practical use, as an optical disc apparatus capable of recording and reproducing code information, picture information and document information which are processed by the data processor. In such an optical disc apparatus, the irreversible change of the recording film is utilized to record information in the recording film, and hence information having been recorded in the recording film cannot be rewritten. Accordingly, in the case where it is necessary to rewrite the recorded information, the following processing is carried out. That is, in the above optical disc apparatus, a region for storing flag information is provided in each block which constitutes a recording/reproducing unit, a flag indicating that information recorded in a block is ineffective, is recorded in the flag region of the block, to theoretically or logically erase the recorded information, and another block on the recording film is specified to write new information in the specified block.

Two kinds of optical discs have been known in which the reversible change of a recording film is utilized to write information in a block and to erase information recorded in the block.

The optical disc of the first kind is called a photo-magnetic type optical disc. In the photo-magnetic type optical disc, a thin magnetic film having the axis of easy magnetization perpendicular thereto is used as the recording film, and information is recorded in the magnetic film by irradiating the magnetic film with laser light in a state that an external magnetic field opposite in direction to the axis of easy magnetization is applied to the magnetic film. That portion of the magnetic film which is irradiated with the laser light, is locally heated. When heated to a Curie temperature, the portion is demagnetized. When the temperature of the portion returns to ordinary temperature, a reverse magnetic domain having the same direction as the external magnetic field is formed at the portion, and is used as the information recording bit. Information recorded in the magnetic film is reproduced by utilizing the phenomenon that it depends upon the direction of magnetization at a light receiving portion whether the polarization plane of light reflected from the light receiving portion rotates clockwise or counterclockwise, that is, by utilizing the magneto-optical effect. Further, the erasure of recorded information is carried out in such a manner that a portion of the magnetic film where information has been recorded, is heated by laser light to the Curie temperature, while applying an external magnetic field having the same direction as the axis of easy magnetization to the magnetic film. The magnetic film of this kind may be made of, for example, a ternary alloy Tb-Fe-Co or Dy-Fe-Co which is proposed in Japanese patent application unexamined publication No. 58-73746.

The optical disc of the second kind utilizes the reversible state change of a recording material due to laser light. For example, as proposed in the Japanese Examined Publication No. 47-26897, an optical disc utilizing the phase transition between the crystalline phase and amorphous phase of the recording film, is typical of optical discs of the second kind.

For such an optical disc, recording, reproducing and erasing operations are performed in the following manner. In the recording operation, a portion of the recording film, assuring the crystalline phase is irradiated with laser light is rapidly cooled to put the portion having small light reflectivity in the amorphous phase. Information recorded in the recording film is reproduced by utilizing the difference in reflectivity between the crystalline portion and amorphous portion of the recording film. Information recorded in the recording film can be erased by heating the recording film and then cooling it slowly.

In a case where a write operation is performed for an erasable optical disc, blocks where information is to be recorded on the basis of write instructions from an upper apparatus, includes a block where information has been recorded wherein an erasing operation is necessary for writing new information, and a block where no information has been recorded and hence desired information can be immediately recorded. In the above case, if a write operation according to a recording mode including an erasing operation, is carried out for each of the write instructions, the erasing operation will be performed even for a block where no information has been recorded. In the recording mode for recording new information in a block after recorded information in the block has been erased it is necessary to first wait for the positioning of the optical head on a desired block three times, that is, before the erasing operation for erasing information which has been recorded in the block, before the write operation for writing new information in the block, and before the read-after-write operation for checking the new information recorded in the block. If such a recording mode is used for all the blocks where information is to be recorded, the efficiency of the write operation for these blocks will be reduced. In the case where the high-ranking apparatus issues an erase instruction only for each of the blocks where information has been recorded, before the write operation, in order to reduce the loss of time, it will be necessary for the high-ranking apparatus to be well aware of the state of every block on the optical disc, thereby placing a heavy burden on the high-ranking apparatus.

SUMMARY OF THE INVENTION

An object of the present invention is to provide a write operation control method capable of writing information efficiently in a rotating type recording medium in which information can be recorded and erased by making use of a reversible change of the recording medium, such as an erasable optical disc.

In order to attain the above object, according to one aspect of the present invention, there is provided a method of controlling a write operation for a rotating type recording medium having a plurality of tracks so that each track is divided into a plurality of blocks having respective addresses and each block is used as an information recording/reproducing unit, which method comprises the steps of: checking the flag field of a block when the block is specified by a high-ranking apparatus and an instruction for writing information in the specified block is issued from the high-ranking apparatus, a flag field being included in each block together with an information recording field, to indicate the presence or absence of recorded information in the information recording field; and executing the first recording mode for immediately recording new information in the information recording field of the specified block or the second recording mode for recording new information in the information recording field of the specified block after an erasing operation has been performed for the information recording field of the specified block, depending upon whether the flag field of the specified block indicates the absence of recorded information or the presence of recorded information.

In a preferred embodiment of a write operation control method according to the present invention, each block constituting an information writing unit is constructed so that the flag field is disposed at a position preceding the information recording field. In the first recording mode, new information is written in the information recording field of the specified block in the first period in which the flag field of the specified block is checked and during which the recording medium is rotated, and in the second period which follows the first period and during which the recording medium is rotated, flag information indicating the presence of recorded information is written in the flag field of the specified block and the new information is read out from the information recording field, to be checked. Further, in the second recording mode, an erasing operation is performed for the information recording field of the specified block in the first period in which the flag field of the specified block is checked and during which the recording medium is rotated, new information is written in the information recording field of the specified block in the second period which follows the first period and during which the recording medium is rotated, and the new information is read out of the information recording field of the specified block in the third period which follows the second period and during which the recording medium is rotated, to be checked.

According to the present invention, even in the case where a write instruction is issued from a high-ranking apparatus to a control unit in such a manner that the high-ranking apparatus specifies a block where information is to be written, and one of the first and second recording modes, when the write instruction reaches the control unit, the control unit can then judge or determine as to whether or not a write operation according to the specified recording mode should be performed, on the basis of the contents of the flag field of the specified block. In more detail, the control unit selects the first recording mode when the flag field indicates the absence of recorded information, and selects the second recording mode when the flag field indicates the presence of recorded information. In the case where the selected recording mode differs from the recording mode specified by the high-ranking apparatus, the control unit informs the high-ranking apparatus of the disagreement between the selected recording mode (namely, the appropriate recording mode) and the specified recording mode, without performing a recording operation for the specified block. Alternatively, the following processing may be carried out. That is, only in the case where the first recording mode is specified by the high-ranking apparatus and the second recording mode is selected by the control unit, the control unit informs the high-ranking apparatus of the disagreement between the specified recording mode and the selected recording mode, without performing a recording operation for the specified block. In other cases, a write operation according to a recording mode which is selected by the control unit on the basis of the contents of the flag field of the specified block, is performed for the specified block.

DESCRIPTION OF THE PREFERRED EMBODIMENTS

Preferred embodiments of the present invention will be explained below, by reference to the drawings.

Figure 1:
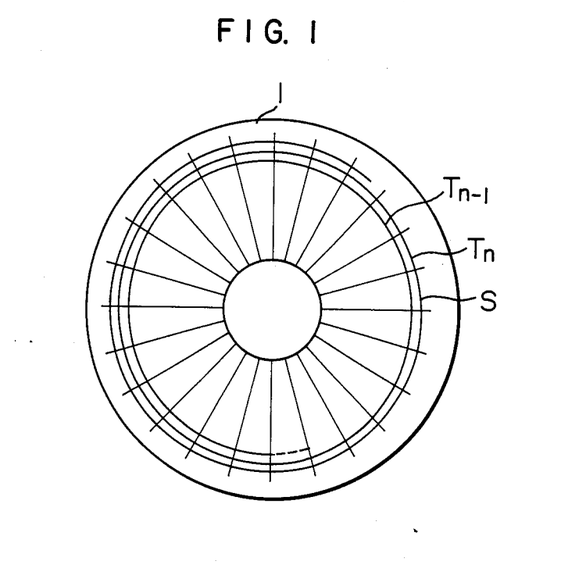
FIG. 1 is a schematic diagram showing an example of a rotating type recording medium, to which a write operation control method according to the present invention is applied.

FIG. 1 shows the construction of the recording surface of an example of a rotating type recording medium, to which a write operation control method according to the present invention is applied. Referring to FIG. 1, an erasable optical disc of photo-magnetic type or phase-transition type is used as the recording medium 1. The recording medium 1 has a plurality of tracks $T_n$, $T_{n-1}$, --- on the recording surface thereof, and each of the tracks is divided into a plurality of blocks (namely, sectors) S. Although the tracks are spirally formed in FIG. 1, the tracks may be concentrically formed.

Figure 2:
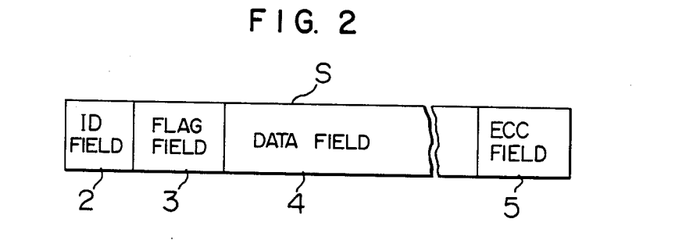
FIG. 2 is a schematic diagram showing the format of one of blocks which are formed on the recording medium of FIG. 1 and each of which is used as an information writing unit.

As exemplified in FIG. 2, each block S includes an identification (ID) field 2 where information for identifying the block is recorded, a flag field 3 where flag information indicating the state of the block is recorded, a data field 4 where digital information with respect to characters and picture images is recorded, and an ECC field 5 where an error correction code (ECC) for checking and correcting an error, thereby making the data field 4 reliable, is recorded. Of these fields, the ID field 2 has been previously recorded in the recording medium 1 before a user receives the recording medium 1. The ECC field 5 and the data field 4 are simultaneously subjected to one of a recording operation and an erasing operation. The flag field 3 is provided so as to be accessed prior to the data field 4. A flag indicating the presence or absence of recorded information in the data field is set in the flag field 3 as one piece of flag information.

According to the present invention, the write operation for the recording medium 1 is performed in such a manner that an appropriate one of two recording modes is used for recording information in the information recording field (namely, the data field 4 and the ECC field 5) of a block.

The first one of the two recording modes is a mode for writing new information in a block where no information has been previously recorded or recorded information has been erased. Accordingly, in the case where information has been written in the data field 4 of a specified block, it is impossible to write new information in the data field by the first recording mode. Accordingly, the first recording mode will be hereinafter referred to as "initial write mode".

Figure 3:
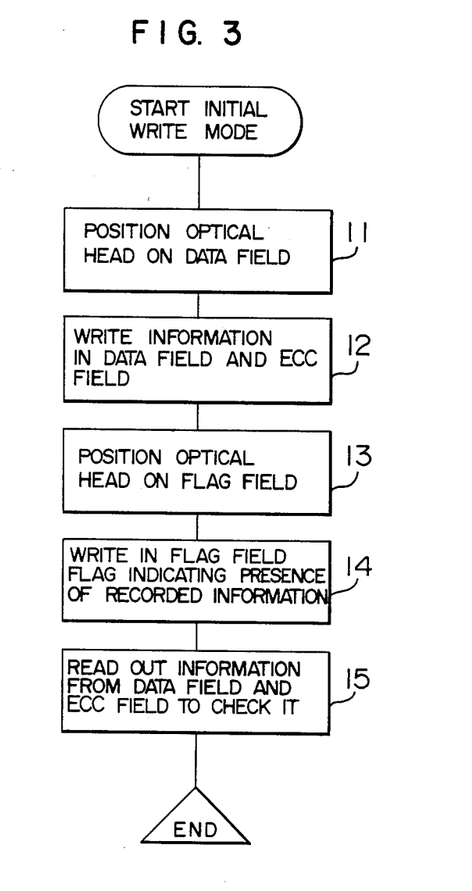
FIG. 3 is a flow chart for explaining a write operation according to an initial write mode which is the first recording mode in the present invention.

In the initial write mode, the access to the recording medium is made in accordance with the procedure shown in FIG. 3. Referring to FIG. 3, an optical head is positioned on the top of the data field 4 of a block which is specified by a high-ranking apparatus (step 11). Predetermined information is written in the data field 4, and then an error correction code (ECC) is written in the ECC field 5 which follows the data field 4 (step 12). Thereafter, the control unit waits for the optical head to again arrive at the specified block after a multiplicity of revolutions of the recording medium. The optical head is positioned on the flag field 3 (step 13). A flag indicating that data has been recorded in the information recording field, is written in the flag field 3 (step 14), and successively the contents of the data field 4 and the ECC field 5 are read out to check whether or not data has been correctly recorded in the fields 4 and 5, that is, a read-after-write operation is performed for these fields 4 and 5 (step 15). In other words, in the initial write mode, the positioning of the optical head on the specified block of the recording medium is first carried out to write new information in the block, and is again carried out to set the above flag in the flag field 3 and to perform the read-after-write operation. Thus, it is necessary to carry out the positioning of the optical head on the specified block twice.

The second recording mode is a mode for writing new information in a block where information has been recorded, and hence will be hereinafter referred to as "update write mode".

Figure 4:
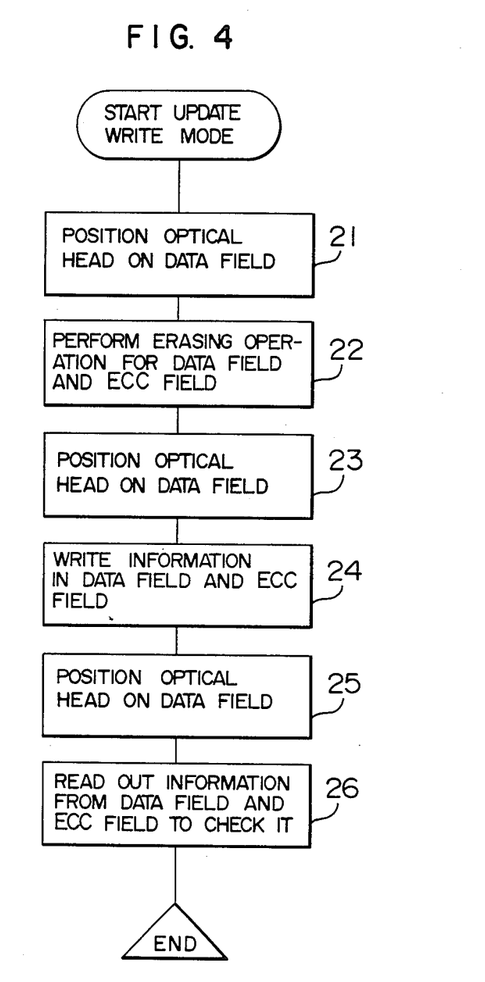
FIG. 4 is a flow chart for explaining a write operation according to an update write mode which is the second recording mode in the present invention.

The write operation according to the update write mode is performed as shown in FIG. 4. Referring to FIG. 4, the optical head is positioned on the top of the data field 4 of a specified block (step 21). Information recorded in the data field 4 and the error correction code recorded in the ECC field 5 are erased (step 22). Next, the optical head is again positioned on the top of the data field 4 of the specified block (step 23). Predetermined information is recorded in the data field 4 and the error correction code is recorded in the ECC field 5 (step 24). Thereafter, the optical head is positioned on the top of the data field 4 for the third time (step 25). The contents of the data field 4 and the ECC field 5 are read out to check whether or not data has been correctly recorded in these fields 4 and 5, that is, a read-after-write operation is performed for the fields 4 and 5 (step 26). In the update write mode, it is necessary to carry out the positioning of the optical head on the specified block three times, since the erasing operation for erasing information which has been recorded in the fields 4 and 5, has to be performed prior to the recording operation for writing new information in the fields 4 and 5 and the read-after-write operation for these fields.

The above-mentioned write operation according to the update write mode is based upon the premise that a flag indicating that information has been recorded in a block where new information is to be recorded, has been already recorded in the flag field 3. Accordingly, an operation for writing the flag which indicates the presence of recorded information, in the flag field 3 is omitted. However, if the write operation according to the update write mode is performed in such a manner that when the positioning of the optical head on the specified block is made for the second time, the optical head is positioned on the flag field prior to the positioning of the optical head on the data field, to erase the flag indicating the presence of recorded information from the flag field, and that when the positioning of the optical head on the specified block is made for the third time, the optical head is positioned on the flag field prior to the positioning of the optical head on the data field, to write the flag indicating the presence of recorded information, in the flag field, it will be possible to apply the write operation according to the update write mode to a block where no information has been recorded. In the above write operation, also, the positioning of the optical head on the specified block is made three times, since the data field follows the flag field.

An explanation will now be given of the first embodiment of a write operation control method according to the present invention. In the first embodiment, when a write instruction is issued from a high-ranking apparatus such as a host computer and a channel apparatus to the control unit in such a manner that the high-ranking apparatus specifies a block where information is to be recorded, one of the initial write mode and the update write mode is selected in accordance with the contents of the flag field of the specified block, and the write operation according to the selected mode is performed for the specified block.

Figure 5:
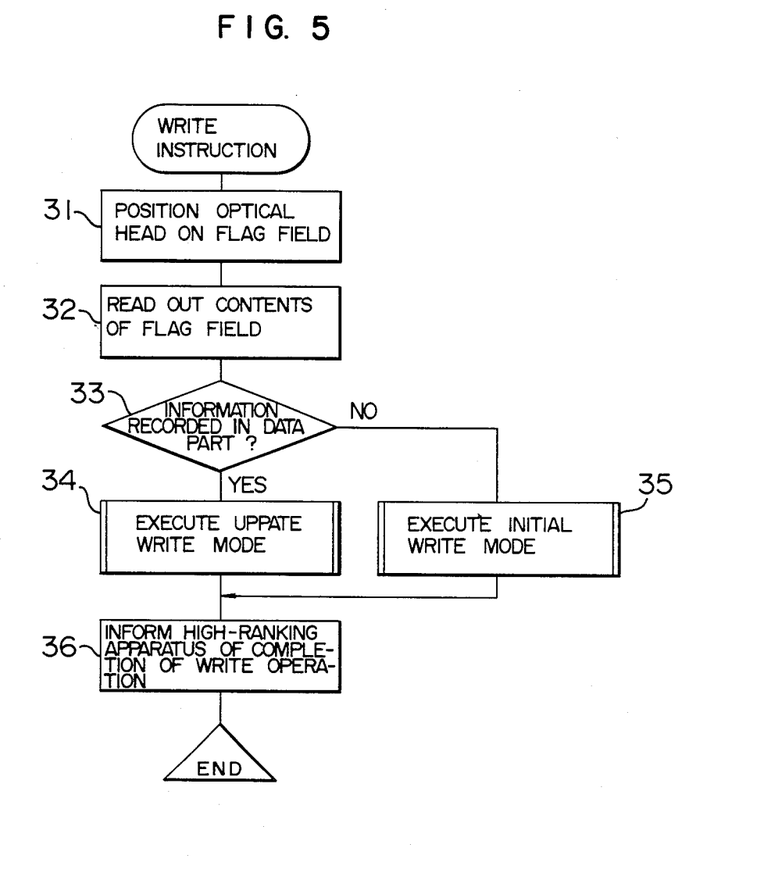
FIG. 5 is a flow chart showing an embodiment of a write operation control method according to the present invention.

FIG. 5 is a flow chart showing the procedure for determining a recording mode (namely, a write mode) which is to be executed, on the control unit side. Referring to FIG. 5, the optical head is positioned on the flag field of a block which is specified by the high-ranking apparatus (step 31). The contents of the flag field is read out (step 32). A flag recorded in the flag field is checked to see whether or not information has been recorded in the data field (step 33). When the flag indicating the presence of recorded information is set in the flag field, the write operation according to the update write mode is performed (step 34). When the flag indicating the absence of recorded information is set in the flag field, the write operation according to the initial write mode is performed (step 35). When the write operation in step 34 or 35 is completed, the control unit informs the high-ranking apparatus of that effect (step 36).

As has been explained with reference to FIGS. 3 and 4, each of the initial write mode and the update write mode starts from the positioning of the optical head on the data field. Further, the data field is placed after the flag field. Accordingly, an operation for determining the contents of the flag field can be followed immediately by the write operation according to the selected recording mode (namely, the selected write mode). Thus, in the processing of FIG. 5, the positioning of the optical head on the specified block is carried out twice for the initial write mode and three times for the update write mode, when the above positioning for the read-after-write operation is counted.

In the initial write mode shown in FIG. 3, the flag indicating the presence of recorded information is written in the flag field immediately before the read-after-write operation. However, if the above flag is written in the flag field immediately before data is written in the data field and the ECC field, it will be necessary to position the optical head on the specified block, before each operation for checking the flag field of the specified block, an operation for writing the flag, predetermined information and the error correction code in the flag field, the data field and the ECC field, respectively, and the read-after-write operation. That is, a waiting time necessary for positioning the optical head on the specified block is required three times, and thus the processing time will be increased.

Next, explanation will be made of the second embodiment of a write operation control method according to the present invention. In the second embodiment, a write instruction is issued from the high-ranking apparatus to the control unit in such a manner that the high-ranking apparatus specifies both the block where information is to be recorded, and the type of recording mode to be used for the block.

In the case where the high-ranking apparatus is well aware of the presence or absence of recorded information in each of the blocks on the recording medium, the high-ranking apparatus can issue a write instruction in such a manner that a recording mode is specified. In this case, a write operation is performed basically in accordance with the specified recording mode. For example, when the high-ranking apparatus erroneously instructs the control unit to execute the initial write mode for a block where information has been recorded, previously-recorded information and newly-recorded information coexist in the data field of the block, and thus abnormal recording takes place. However, the abnormal recording is detected by the read-after-write operation. Accordingly, if the high-ranking apparatus instructs the control unit to execute the update write mode for the above block, desired information will be correctly written in the block. However, it brings about a great time loss to perform a write operation according to the update write mode for a block after a write operation according to the initial write mode has been performed for the block.

In the second embodiment, even when a recording mode is specified by the high-ranking apparatus, a recording mode to be executed is selected on the control unit side on the basis of the contents of the flag field of a specified block, and if the recording mode selected on the control unit side differs from the recording mode specified by the high-ranking apparatus, the control unit informs the high-ranking apparatus of the disagreement between the selected recording mode and the specified recording mode, without performing any write operation. Accordingly, the high-ranking apparatus can be informed of the above disagreement at the first positioning of the optical head on the specified block, and thus can early issue the second write instruction.

The third embodiment of a write operation control method according to the present invention is different from the above-mentioned second embodiment in that when the recording mode selected on the control unit side differs from the recording mode specified by the high-ranking apparatus, a write operation is performed based on the determination made on the control unit side. Now, explanation will be made of the third embodiment, with reference to the flow chart shown in FIG. 6.

Figure 6:
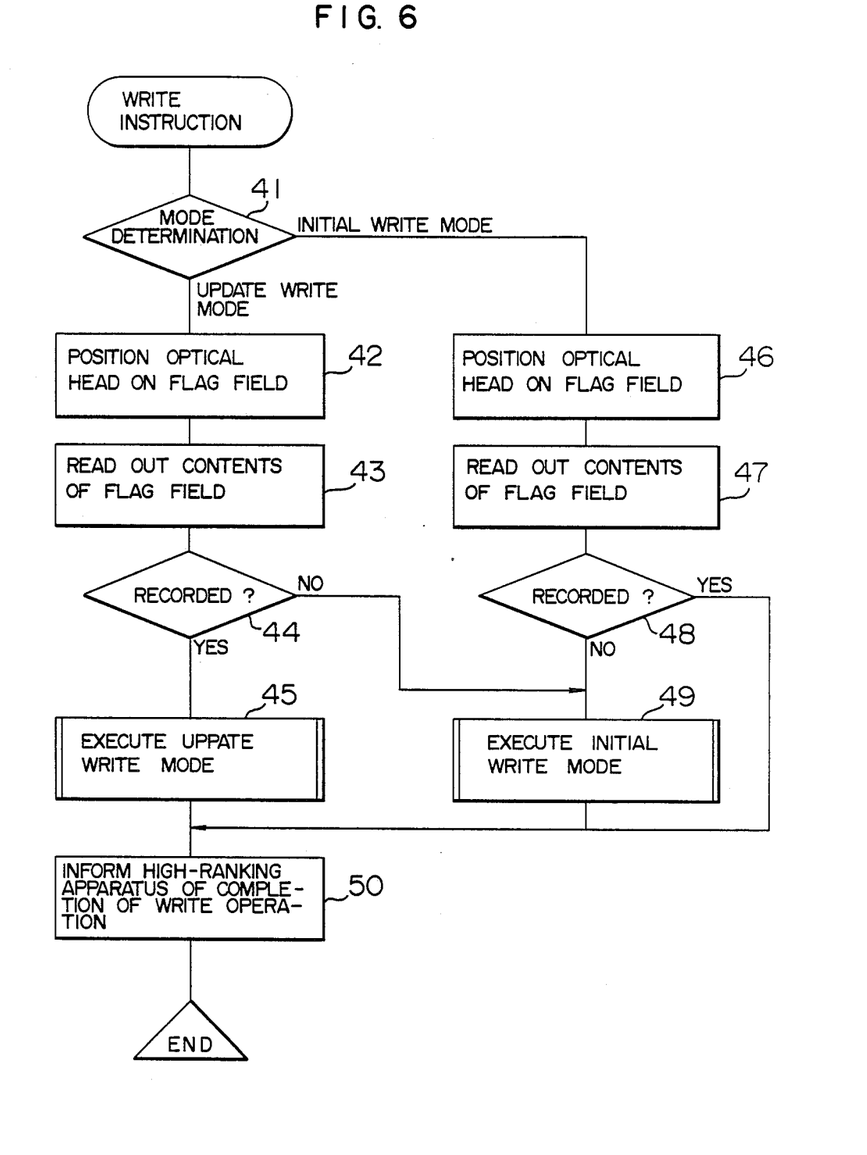
FIG. 6 is a flow chart showing another embodiment of a write operation control method according to the present invention.

When the control unit receives a write instruction from the high-ranking apparatus, it determines whether a recording mode specified by the high-ranking apparatus is the update write mode or the initial write mode (step 41). When the specified recording mode is determined to be the update write mode, the optical head is positioned on the flag field of a specified block (step 42), and the contents of the flag field are read out (step 43), and it determines on the basis of the contents of the flag field whether information has been recorded in the data field of the specified block or not (step 44). When information has been recorded in the data field, a write operation according to the update write mode is performed for the data field (step 45). When information has not been recorded in the data field, a write operation according to the initial write mode is performed for the data field (step 49). When the write operation in step 45 or 49 has been completed, the high-ranking apparatus is informed of that effect (step 50). That is, even in the case where the update write mode is specified by the high-ranking apparatus, when it is determined from the contents of the flag field of the specified block that the specified block has not yet been used, the initial write mode is selected on the control unit side. Thus, an unnecessary step of an erasing operation is omitted, and hence the recording processing time is shortened. In the case where the specified recording mode is the initial write mode, the contents of the flag field of the specified block are read out (steps 46 and 47). Based on the contents of the flag field a determination is made as to whether or not information has been recorded in the data field of the specified block (step 48). When information has not been recorded in the data field, a write operation according to the initial write mode is performed (step 49). When information has been recorded in the data field, the control unit informs the high-ranking apparatus of that effect, without performing any write operation (step 50). Thus, the control unit can inform the high-ranking apparatus that the specified recording mode is the wrong mode, without destroying information which has been recorded in the specified block. Accordingly, the high-ranking apparatus can again issue a write instruction in such a manner that the high-ranking apparatus specifies a block different from the initially specified block. Alternatively, when information having been recorded in the initially specified block is determined to be useless, the high-ranking apparatus can again issue a write instruction in such a manner that the high-ranking apparatus specifies the initially specified block once more but now specifying the update write mode.

Figure 7:
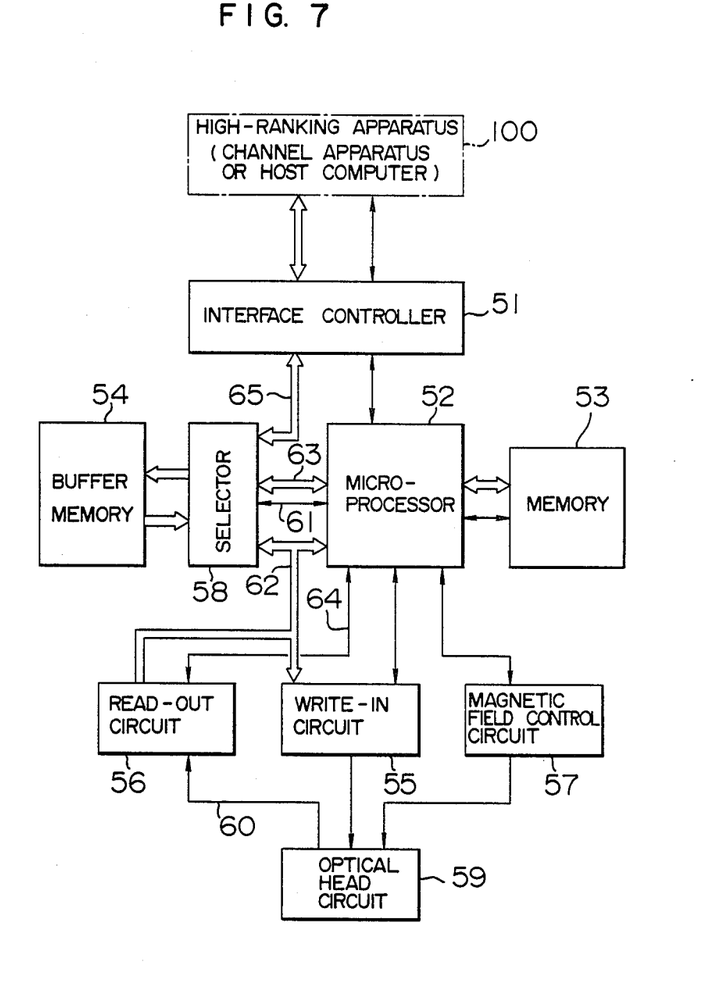
FIG. 7 is a block diagram showing an example of a control unit for carrying out a write operation control method according to the present information.

FIG. 7 shows a control unit incorporated in a photomagnetic type optical disc apparatus for carrying out a write operation control method according to the present invention.

In FIG. 7, reference numeral 51 designates an interface controller for transferring signals between the control unit and a high-ranking apparatus 100 such as a channel apparatus and a host computer, a microprocessor 52 for operating the control unit in accordance with a predetermined procedure to perform a desired write operation, a memory 53 for storing microinstructions which define control operations of the microprocessor 52, a buffer memory 54 for storing information which is to be recorded in an optical disc and information which is read-out of the optical disc, a write-in circuit 55 for adding the error correction code to information read-out from the buffer memory 54 and for modulating the information thus obtained, to send the modulated information to an optical head circuit 59, a read-out circuit 56 for demodulating the output signal 60 of the optical head circuit 59 to load the demodulated signal in the buffer memory 54, a magnetic field control circuit 57 used for erasing information which has been recorded in the optical disc, and a selector 58 for selecting one of input and output buses of the buffer memory 54, that is, for selectively connecting an interface bus 65, a processor bus 63 and a read-out/write-in circuit bus 62 to the buffer memory 54 in accordance with a microinstruction 61 from the microprocessor 52.

Figure 8:
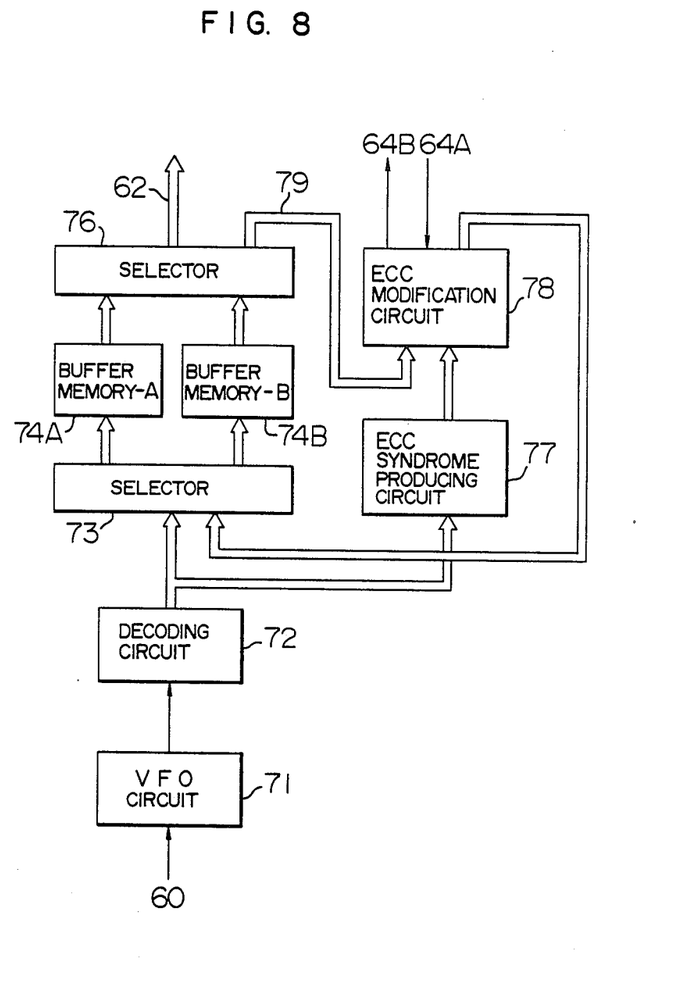
FIG. 8 is a block diagram showing the detailed construction of the read-out circuit of FIG. 7.

FIG. 8 is a block diagram showing an example of the read-out circuit 56 of FIG. 7. Referring to FIG. 8, the output signal 60 from the optical head circuit 59 is applied to a VFO circuit 71, the output of which is demodulated by a decoding circuit 72, and is then sent to one of buffer memories 74A and 74B through a selector 73, to be sent to a signal line 79 through a selector 76.

The output of the decoding circuit 72 is not only applied to one of the buffer memories 74A and 74B, but also sent to an ECC syndrome producing circuit 72, to produce an ECC syndrome. The ECC syndrome thus obtained is applied to an ECC modification circuit 78. When data corresponding to one recording unit on the optical disc is loaded in the buffer memory 74A or 74B, the ECC modification circuit 78 takes in both the data and the ECC syndrome produced by the ECC syndrome producing circuit 77, and modifies the data on the basis of the ECC syndrome, if necessary. The modified data is loaded in the buffer memory 74A or 74B in place of the optical data. The modified data is sent from the buffer memory 74A or 74B to the buffer memory 54 of FIG. 7 through the selector 76 and the bus 62. Further, the modified data from the ECC modification circuit 78 is sent to the microprocessor 52 through a signal line 64B, which is one of signal lines 64A and 64B making up a bus 64 (shown in FIG. 7).

The read-out circuit of FIG. 8 includes a pair of buffer memories 74A and 74B. This is because data in the optical disc can be continuously read-out by using one of the buffer memories 74A and 74B to receive data from the decoding circuit 72 at a time the other buffer memory is used for the modification of data based upon the ECC syndrome.

As can be seen from the foregoing explanation, according to the present invention, flag information indicating the presence or absence of recorded information in the information recording field of a specified block on an erasable, rotating-type recording medium is checked by a control unit, and an appropriate one selected from two recording modes in accordance with the flag information is used for writing information in the specified block. Thus, a useless and unnecessary erasing operation step is deleted, and hence a write operation can be efficiently performed. Accordingly, even when a high-ranking apparatus is not aware of the state of each block on the recording medium, the write operation for each block can be rapidly performed.

We claim:

1. A method of controlling a write operation for a rotating type recording medium, said recording medium having a plurality of tracks, each track being divided into a plurality of blocks having respective addresses, each block being used as an information recording/reproducing unit, comprising the steps of:

checking a flag field of a block when said block is specified by a high-ranking apparatus and an instruction for writing information in the specified block is issused from said high-ranking apparatus, said flag field being included in each block together with an information recording field, to indicate the presence or absence of recorded information in the information recording field; and executing a first recording mode for immediately recording new information in the information recording field of the specified block when the flag field of the specified block indicates the absence of recorded information or a second recording mode for recording new information in the information recording field of the specified block after an erasing operation is performed for the information recording field of the specified block when the flag field of the specified block indicates presence of recorded information.

2. A method according to claim 1, wherein each block has its flag field located at a position preceding the information recording field, and wherein said first recording mode is executed in such a manner that new information is written in the information recording field of said specified block in the first period in which the flag field of said specified block is checked and during which said recording medium is rotated, and that in the second period which follows the first period and during which said recording medium is rotated, flag information indicating the presence of recorded information is written in the flag field of said specified block and a read operation is performed for the information recording field of said specified block to check information recorded therein.

3. A method according to claim 2, wherein the said second recording mode is executed in such a manner that an erasing operation is first performed for the information recording field of said specified block in the first period in which the flag field of said specified block is checked and during which said recording medium is rotated, that an operation for writing new information in the information recording field of said specified block is performed in the second period which follows the first period and during which said recording medium is rotated, and that in the third period which follows the second period and during which said recording medium is rotated, a read operation is performed for the information recording field of said specified block, to check information recorded therein.

4. A method of controlling a write operation for a rotating type recording medium, said recording medium having a plurality of tracks, each track being divided into a plurality of blocks having respective addresses, each block having an information recording field and a flag field indicating the presence or absence of recorded information in the information recording field, said write operation being performed for each block in response to a write instruction issued from a high-ranking apparatus to a control unit, said method comprising the steps of:

checking the flag field of a block when said high-ranking apparatus issues a write instruction to said control unit in such a manner that said high-ranking apparatus specifies said block as a block where new information is to be recorded, and specifies one of a first recording mode for immediately recording new information in the information recording field of the specified block and a second recording mode for recording new information in the information recording field of said specified block after an erasing operation has been performed for said information recording field; and determining whether or not a write operation according to the specified one of the first and second recording modes is to be performed, on the control unit side, on the basis of the contents of the flag field of said specified block, said control unit being constructed so as to be able to perform both a write operation according to the first recording mode and a write operation according to the second recording mode.

5. A method according to claim 4, wherein said control unit selects the first recording mode when the flag field of said specified block indicates the absence of recorded information, and selects the second recording mode when the flag field of said specified block indicates the presence of recorded information, and wherein when one of the first and second recording modes selected by said control unit differs from one of the first and second recording modes specified by said high-ranking mode, said control unit informs said high-ranking apparatus of the disagreement between the selected recording mode and the specified recording mode, without performing an information recording operation for said specified block.

6. A method according to claim 5, wherein each block has its flag field located at a position preceding the information recording field, and wherein the first recording mode is executed in such a manner that new information is written in the information recording field of said specified block in the first period in which the flag field of said specified block is checked and during which said recording medium is rotated, and that in the second period which follows the first period and during which said recording medium is rotated, flag information indicating the presence of recorded information is written in the flag field of said specified block and a read operation is performed for the information recording field of said specified block to check information recorded therein.

7. A method according to claim 6, wherein the second recording mode is executed in such a manner that an erasing operation is performed for the information recording field of said specified block in the first period in which the flag field of said specified block is checked and during which said recording medium is rotated, that an operation for writing new information in the information field of said specified block is performed in the second period which follows the first period and during which said recording medium is rotated, and that in the third period which follows the second period and during which said recording medium is rotated, a read operation is performed for the information recording field of said specified block, to check information recorded therein.

8. A method according to claim 4, wherein said control unit selects the first recording mode when the flag field of said specified block indicates the absence of recorded information and selects the second recording mode when the flag field of said specified block indicates the presence of recorded information, and wherein in a case where the first recording mode is specified by said high-ranking apparatus and the second recording mode is selected by said control unit, said control unit informs said high-ranking apparatus of the disagreement between the specified recording mode and the selected recording mode without performing an information recording operation for said specified block, and in other cases, an information recording operation is performed for said specified block in a recording mode which is selected by said control unit on the basis of the contents of the flag field of said specified block.

9. A method according to claim 8, wherein each block has its flag field located at a position preceding the information recording field, and wherein the first recording mode is executed in such a manner that new information is written in the information recording field of said specified block in the first period in which the flag field of said specified block is checked and during which said recording medium is rotated, and that in the second period which follows the first period and during which said recording medium is rotated, flag information indicating the presence of recorded information is written in the flag field of said specified block and a read operation is performed for the information recording field of said specified block to check information recorded therein.

10. A method according to claim 9, wherein the second recording mode is executed in such a manner that an erasing operation is performed for the information recording field of said specified block in the first period in which the flag field of said specified block is checked and during which said recording medium is rotated, that an operation for writing new information in the information field of said specified block is performed in the second period which follows the first period and during which said recording medium is rotated, and that in the third period which follows the second period and during which said recording medium is rotated, a read operation is performed for the information recording field of said specified block, to check information recorded therein.

11. A method according claim 4, wherein each block has its flag field located at a position preceding the information recording field, and wherein the first recording mode is executed in such a manner that new information is written in the information recording field of said specified block in the first period in which the flag field of said specified block is checked and during which said recording medium is rotated, and that in the second period which follows the first period and during which said recording medium is rotated, flag information indicating the presence of recorded information is written in the flag field of said specified block and a read operation is performed for the information recording field of said specified block to check information recorded therein.

12. A method according to claim 11, wherein the second recording mode is executed in such a manner that an erasing operation is performed for the information recording field of said specified block in the first period in which the flag field of said specified block is checked and during which said recording medium is rotated, that an operation for writing new information in the information field of said specified block is performed in the second period which follows the first period and during which said recording medium is rotated, and that in the third period which follows the second period and during which said recording medium is rotated, a read operation is performed for the information recording field of said specified block, to check information recorded therein.

* * * * *